United States Patent [19]

Hihara et al.

[11] Patent Number: 4,843,150
[45] Date of Patent: Jun. 27, 1989

[54] PYRAZOLONE OR PYRIDONE TYPE WATER SOLUBLE DISAZO COLORANT CONTAINING ONE OR TWO TRIAZINE RINGS

[75] Inventors: Toshio Hihara; Yukiharu Shimizu; Kanzi Shimizu, all of Kitakyushu, Japan

[73] Assignee: Mitsubushi Chemical Industries Limited, Japan

[21] Appl. No.: 71,644

[22] Filed: Jul. 9, 1987

[30] Foreign Application Priority Data

Jul. 9, 1986 [JP] Japan .................. 61-162556
Jul. 9, 1986 [JP] Japan .................. 61-162557
Feb. 3, 1987 [JP] Japan .................. 62-21804
Feb. 3, 1987 [JP] Japan .................. 62-21805

[51] Int. Cl.$^4$ .................. C09B 62/09; C09B 62/513; D06P 1/382; D06P 1/384
[52] U.S. Cl. .................. 534/634; 534/617; 534/632; 534/635; 534/636; 534/637; 534/642; 534/631
[58] Field of Search .............. 534/634, 635, 636, 637, 534/632, 631

[56] References Cited

U.S. PATENT DOCUMENTS

| | | | |
|---|---|---|---|
| 3,926,944 | 12/1975 | Berrie et al. | 534/634 |
| 4,228,071 | 10/1980 | Riat et al. | 534/634 |
| 4,645,832 | 2/1987 | Niwa et al. | 534/637 |
| 4,670,547 | 6/1987 | Lehr | 534/634 X |

FOREIGN PATENT DOCUMENTS

| | | | |
|---|---|---|---|
| 2413443 | 7/1979 | France | 534/638 |
| 60-215882 | 10/1985 | Japan | 534/634 |
| 1454210 | 11/1976 | United Kingdom | 534/638 |
| 1461125 | 1/1977 | United Kingdom | 534/634 |
| 2085908 | 5/1982 | United Kingdom | 534/634 |
| 2159829 | 12/1985 | United Kingdom | 534/638 |

*Primary Examiner*—Floyd D. Higel
*Attorney, Agent, or Firm*—Jordan B. Bierman

[57] ABSTRACT

A water soluble disazo colorant represented by formula (I) in the form of free acid:

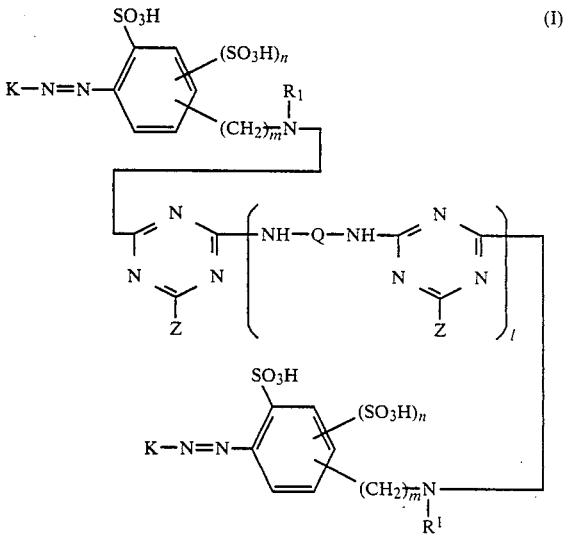

(I)

wherein K represents

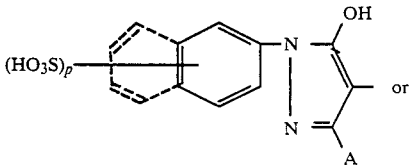

or

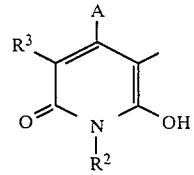

[wherein A represents a methyl group or a carboxylic group;

(Abstract continued on next page.)

$R^2$ represents a hydrogen atom, an alkyl group of 1 to 8 carbon atoms, a sulfoalkyl grouop of 1 to 4 carbon atoms, or an alkyl group of 1 to 4 carbon atoms which is substituted by an alkoxy group of 1 to 4 carbon atoms;

$R^3$ represents a hydrogen atom, a halogen atom, a cyano group, a —CONH$_2$ group, a carboxyl group, a sulfonic group, or a sulfomethyl group, p represents an integer of 1 or 2];

Z represents a fluorine atom or

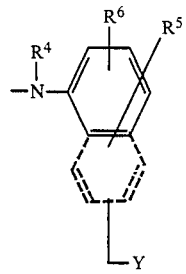

[wherein $R^4$ represents a hydrogen atom or an alkyl group of 1 to 4 carbon atoms;

$R^5$ and $R^6$ each represents independently a hydrogen atom, an alkyl group of 1 to 4 carbon atoms, an alkoxy group of 1 to 4 carbon atoms, a sulfonic group, or a halogen atom; Y represents —SO$_2$CH=CH$_2$ or —SO$_2$CH$_2$CH$_2$W (wherein W represents a group which is released by the action of an alkali)];

$R^1$ represents a hydrogen atom or a lower alkyl group of 1 to 4 carbon atoms;

Q represents a divalent aromatic or aliphatic residual group; and l, m, and n each represents an integer of 0 or 1. Such colorants are useful in the dyeing of fibrous materials.

10 Claims, 10 Drawing Sheets

PYRAZOLONE OR PYRIDONE TYPE WATER SOLUBLE DISAZO COLORANT CONTAINING ONE OR TWO TRIAZINE RINGS

FIELD OF THE INVENTION

The present invention relates to a yellow water soluble disazo colorant of novel structure and, in particular, to a disazo colorant of molecular structure having two molecules of monoazo colorant combined through one or two triazine groups having a reacting group and which has excellent reactivity and fixability on cellulose fiber and nitrogen-containing fiber, and to a dyeing method using the disazo colorant.

BACKGROUND OF THE INVENTION

As a colorant for dyeing cellulose fiber or nitrogen-containing fiber, a water soluble reactive dyestuff has been usually used, and reactive dyes of various structure have been proposed so far. In dyeing the above-mentioned fiber with the conventional water soluble reactive dyestuff, a relatively low temperature of from about 60° to 70° C. of dyeing bath has been, in general, used.

In recent years, mixed fiber, for example, that of cellulose fiber with polyester fiber has been often used with diversification of fiber material. As a dyeing method for such mixed fiber, a so-called two-stage dyeing method is used, so that, first, the polyester fiber is dyed with a dispersion dyestuff at a high temperature of from about 120° to 140° C. and subsequently, the cellulose fiber is dyed with a reactive dyestuff at a low temperature of from about 60° to 70° C. Recently, however, a single-bath, one-step dyeing method for dyeing simultaneously the cellulose fiber and polyester fiber by combining a reaction dyestuff with a disperse dyestuff and by use of a hot dyeing bath at from 120° to 140° C. has been demanded.

The dyeing method has, however, a problem that, if cellulose fiber is dyed with a conventional reactive dyestuff in a hot bath at from 120° to 140° C., the reactivity and fixability of dyestuff to the fiber are low because of side reactions such as decomposition and a good dyed product cannot be obtained. As a dyestuff to alleviate the abovementioned defect, for example, a pyrazolone-containing reactive dyestuff represented by a formula (A) or a pyridone-containing reactive dyestuff represented by a formula (B) as set forth below has been proposed (refer to U.S. Pat. No. 4,453,945).

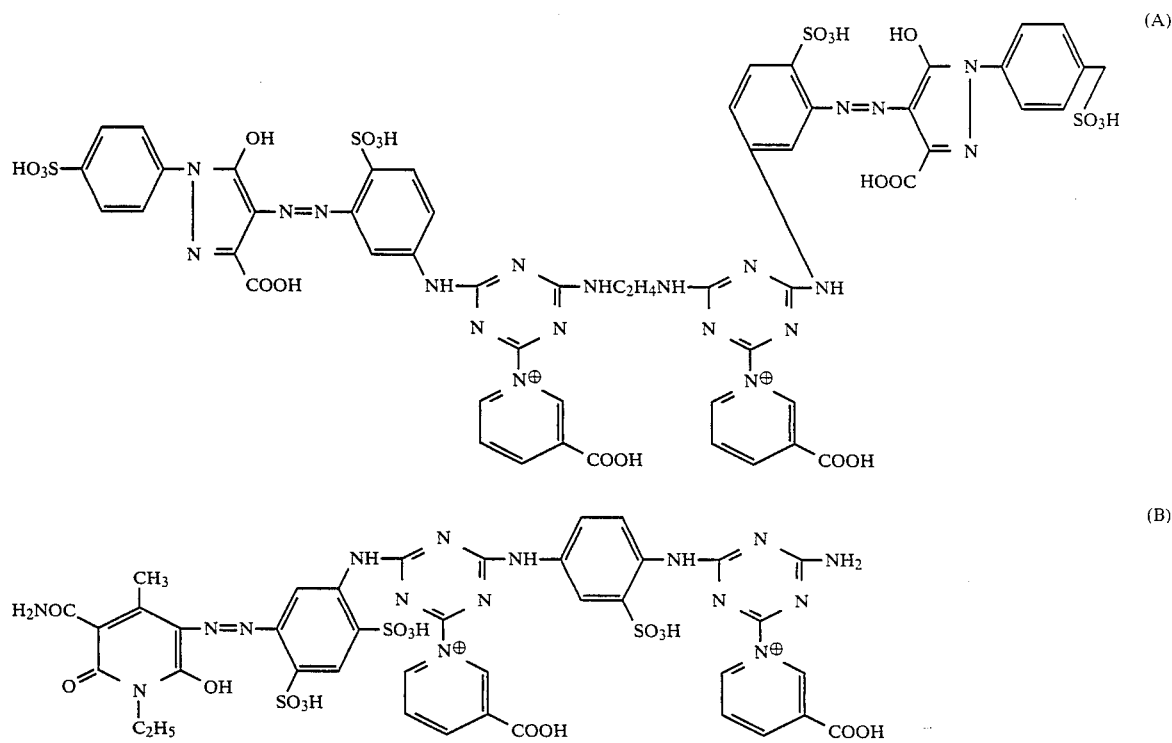

If cellulose fiber is dyed by use of the above-mentioned dyestuff in a hot dyeing bath, for example, at about 130° C., an effect to some extent can be obtained but the degree of exhaustion and buildup properties are insufficient and a good dyed product cannot be obtained.

SUMMARY OF THE INVENTION

The object of the invention is to provide a water soluble reactive dyestuff of novel structure which can solve the mooted points as mentioned above and a dyeing method using the reactive dyestuff.

According to the invention there is to provide a water soluble disazo colorant represented by a general formula (I) as set forth below in the form of free acid and a dyeing method for cellulose fiber or nitrogen-containing fiber with the water soluble disazo colorant represented by the above-mentioned general formula (I) in the form of free acid.

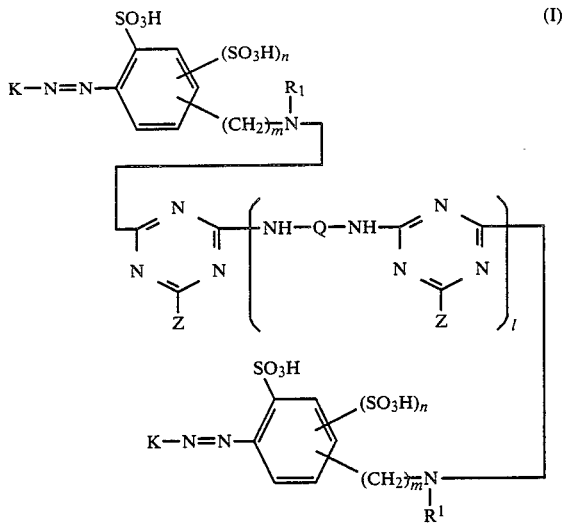

wherein K represents

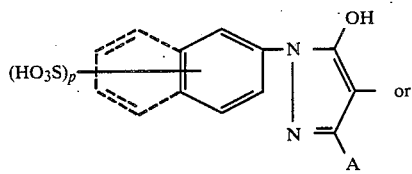 or

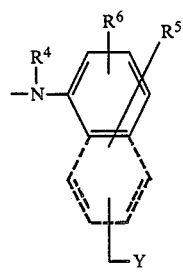

[wherein A represents a methyl group or a carboxylic group;

R$^2$ represents a hydrogen atom, an alkyl group of 1 to 8 carbon atoms, a sulfoalkyl group of 1 to 4 carbon atoms, or an alkyl group of 1 to 4 carbon atoms which is substituted by an alkoxy group of 1 to 4 carbon atoms;

R$^3$ represents a hydrogen atom, a halogen atom, a cyano group, a —CONH$_2$ group, a carboxylic group, a sulfonic group, or a sulfomethyl group, p represents an integer of 1 or 2];

Z represents a fluorine atom or

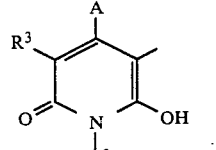

[wherein R$^4$ represents a hydrogen atom or an alkyl group of 1 to 4 carbon atoms;

R$^5$ and R$^6$ each represents independently a hydrogen atom, an alkyl group of 1 to 4 carbon atoms, an alkoxy group of 1 to 4 carbon atoms, a sulfonic group, or a halogen atom;

Y represents —SO$_2$CH=CH$_2$ or —SO$_2$CH$_2$CH$_2$W (wherein W represents a group which is released by the action of an alkali)];

R$^1$ represents a hydrogen atom or a lower alkyl group of 1 to 4 carbon atoms;

Q represents a divalent aromatic or aliphatic residual group; and l, m, and n each represents an integer of 0 or 1.

DETAILED DESCRIPTION OF THE INVENTION

The invention will be described in detail hereinafter.

The disazo colorant of the invention represented by the above-mentioned general formula (I) is a colorant of structure having two molecules of pyrazolone-containing or pyridone-containing monoazo compound combined through one or two triazine rings, so that the disazo colorant of the invention has usually symmetric structure.

In the above-mentined general formula (I), K represetts a group of pyrazolone type or of pyridone type as shown below.

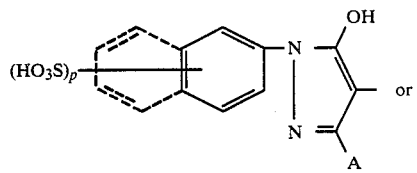

[Pyrazolone type]

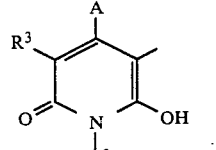

[Pyridone type]

In the formulae, A represents a methyl group or a carboxyl group and p represents an integer of 1 or 2. R$^2$ represents an alkyl group of 1 to 8 carbon atoms such as methyl group, ethyl group, linear or branched propyl group, butyl group, hexyl group, octyl group, or the like; a sulfo alkyl group of 1 to 4 carbon atoms such as sulfoethyl group, sulfopropyl group, or the like; or an alkyl group of 1 to 4 carbon atoms which is substituted by an alkoxy group of 1 to 4 carbon atoms such as methoxyethyl group, ethoxyethyl group, ethoxypropyl group, butoxyethyl group, propoxymethyl group, or the like. R$^3$ represents a hydrogen atom; a halogen atom such as chlorine, bromine, or fluorine, and preferably a chlorine or bromine atom; a cyano group; a —CONH$_2$ group; a carboxyl group; a sulfonic group; or a sulfomethyl group. In the invention, it is preferred that K is a group of the above-mentioned pyrazolone type.

R$^1$ in the above-mentioned general formula (I) represents a hydrogen atom or the similar alkyl group of 1 to 4 carbon atoms as exemplified in the above-mentioned R$^2$, and it is specially preferably a hydrogen atom.

Q in the above-mentioned general formula (I) is a group to connect two —NH— groups in its both sides and it is a divalent aromatic or aliphatic residual group. Such a divalent aromatic residual group may be substituted by an alkyl group of 1 to 4 carbon atoms such as methyl group, ethyl group or the like, an alkoxy group of 1 to 4 carbon atoms such as methoxy group, ethoxy group, or the like, a halogen atom such as chlorine atom or bromine atom, a carboxyl group, or a sulfonic group. As the divalent aromatic residual group which may have the above-mentioned substituent, there may be mentioned, for example, the following groups.

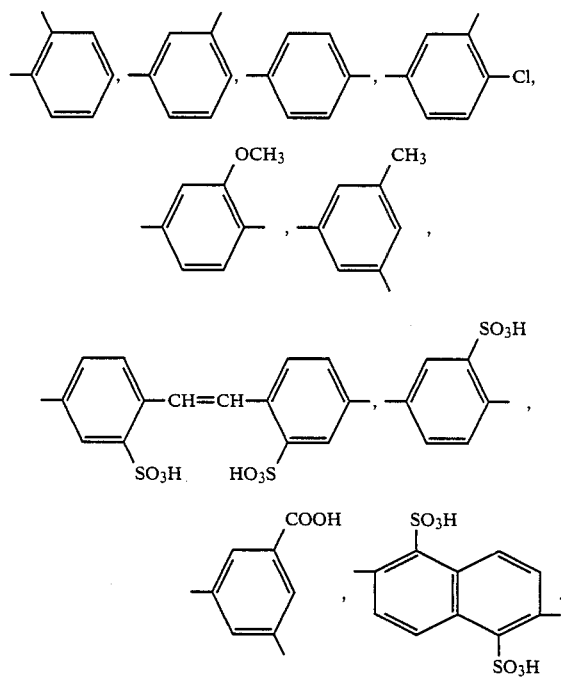

As the divalent aliphatic residual group, there may be mentioned, for example, the following groups.

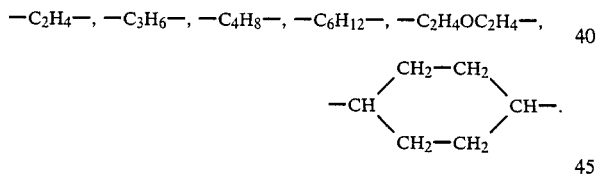

It is preferred that Q is a divalent aromatic residual group which may have the above-mentioned sustituent and it is, in particular, preferred that Q is a phenylene group which may have the above-mentioned substituent.

Z in the above-mentioned general formula (I) is the most important subtituent in the disazo colorant of the invention. Z is a fluorine atom or a substituted amino group as shown below.

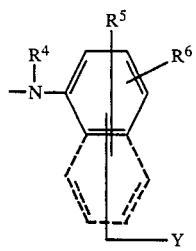

[wherein $R^4$ represents a hydrogen atom or the similar alkyl group of 1 to 4 carbon atoms as exemplified in the above-mentioned $R^2$; and $R^5$ and $R^6$ each represents independently a hydrogen atom, the similar alkyl group of 1 to 4 carbon atoms as exemplified in the above-mentioned $R^2$; an alkoxy group of 1 to 4 carbon atoms such as methoxy, ethoxy, propoxy, or butoxy group; sulfonic group; or a halogen atom such as chlorine, bromine, or fluorine, preferably a chlorine or bromine atom.

As the specirfic example of the substituted amino group, there may be mentioned, for example, the following groups.

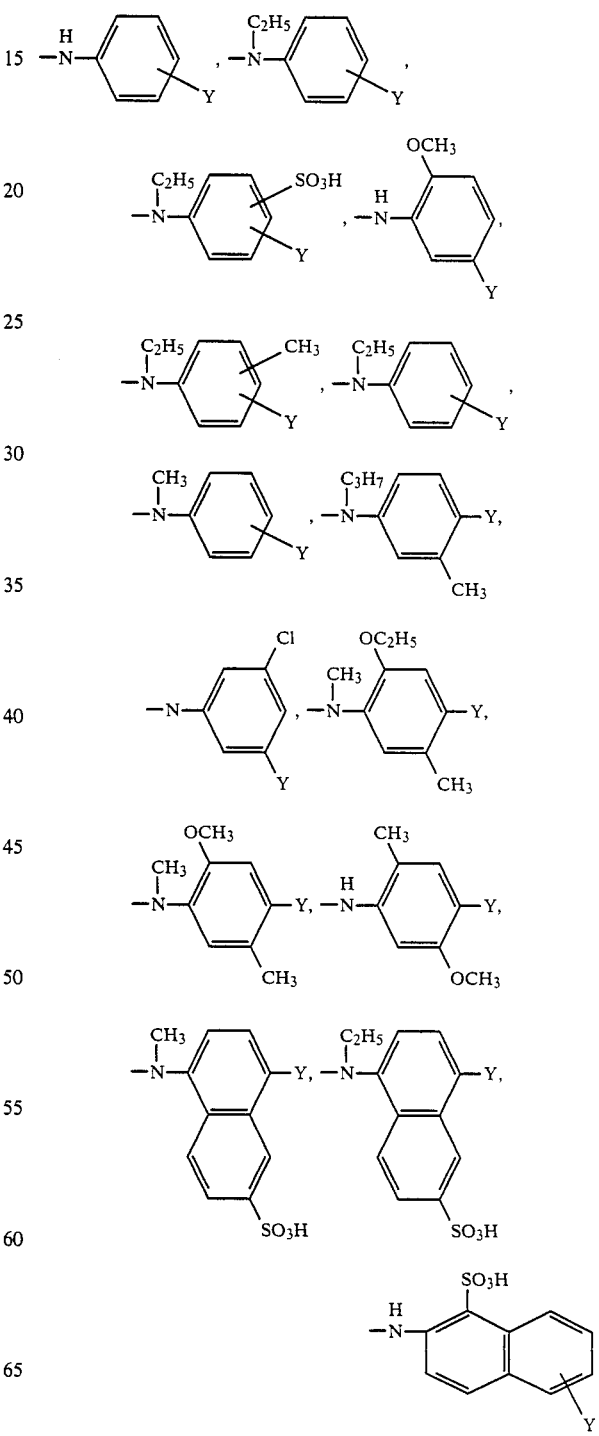

On the other hand, Y represents —SO$_2$CH=CH$_2$ or —SO$_2$CH$_2$CH$_2$W, and W is a group which is released by the action of an alklai. As the sample of W, there may be mentioned acid ester groups such as sulfuric ester group, thiosulfuric ester group, phosphoric ester group, acetic ester group, and the like, and halogen atoms such as chlorine atom and the like.

In the invention, it is preferred that Z is the above-mentioned substituted amino roup and it is, in particular, preferred that Z is a group represented by

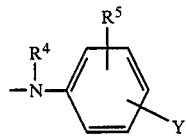

(wherein R$_4$, R$^5$ and Y have the same meaning as the above-mentioned R$^4$, R$^5$ and Y have).

In the above-mentioned general formula (I), l is an integer of 0 or 1 but preferably l is 0, that is, the colorant represented by the general formula (I) wherein only one triazine ring having a substituent group Z is existent is, in particular, preferred.

In the general formula (I), m and n each represents 0 or 1 and it is preferred that m and n each represents 0.

and l is 0 can be prepared, for example, by the following process.

2 mols of aniline compound represented by a general formula (II)

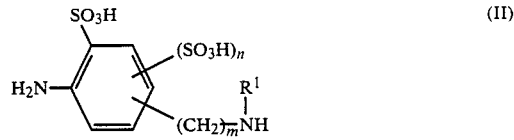

(wherein R$^1$, m and n have the same meaning as defined in the above-mentioned geneal formula (I)) in the form of free acid, and 1 mol of triazine compound represented by a general formula (III),

(wherein X represents a halogen atom) are condensed to form a diamino compound represneted by a general formula (IV),

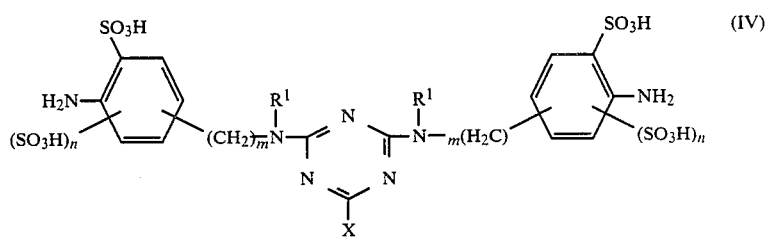

The water soluble disazo colorant of the invention is existent in the form of free acid or salt thereof. Its salts are usually alkali metal salts or alkali earth metal salts and its lithium salt, sodium salt, and potassium salt are preferred.

The disazo colorant of the invention represented by the above-mentioned general formula (I) in the form of free acid can be prepared by an optional process. The disazo colorant represented by the above-mentioned general formula
(I) wherein K is

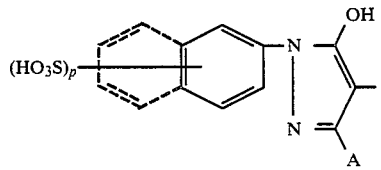

(wherein R$^1$, X, m and n have the same meaning as defined in the above-mentioned general formulae (II) and (III)) in the form of free acid. 1 mol of the diamino compound (IV) is tetrazotized and, after that, is coupled with 2 mols of pyrazolone-containing compound represented by a general formula (V-i),

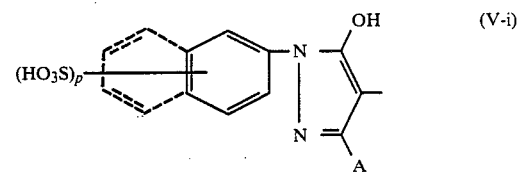

(wherein A and p have the same meaning as defined in the above-mentioned general formula (I)). As a result a compound represented by a general formula (I-i),

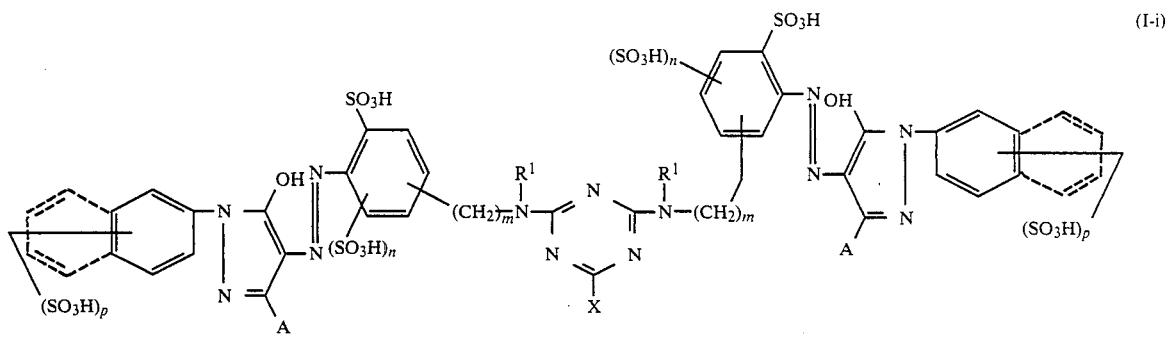

(wherein $R^1$, A, X, m, n and p have the same meaning as defined in the above-mentioned general formulae (I) and (III)) in the form of free acid is obtained. The compound (I-i) is included in the colorant of the invention if X is a fluorine atom. Further, the compound represented by the general formula (I-i) is reacted with an amino compound represented by the following general formula (IV) in water at from 70° to 100° C.

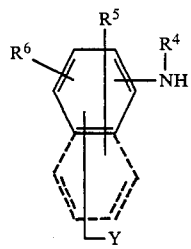 [VI]

(wherein $R^4$, $R^5$, $R^6$ and Y have the same meaning as defined in the above-mentioned general formula (I)). By the above-mentioned reaction, a disazo colorant having a reactive group other than a fluorine atom which is represented by the following general formula (I-ii) in the form of free acid can be obtained.

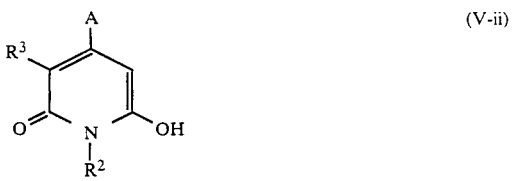 (V-ii)

(wherein A, $R^2$ and $R^3$ have the same meaning as defined in the above-mentioned general formula (I)) instead of the compound represented by the above-mentioned general formula (V-i) and then carrying out the same reaction as mentioned above, the colorant of the invention represented by the above-mentioned general formula (I) wherein K is

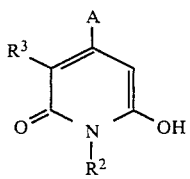

and l is 0, can be obtained.

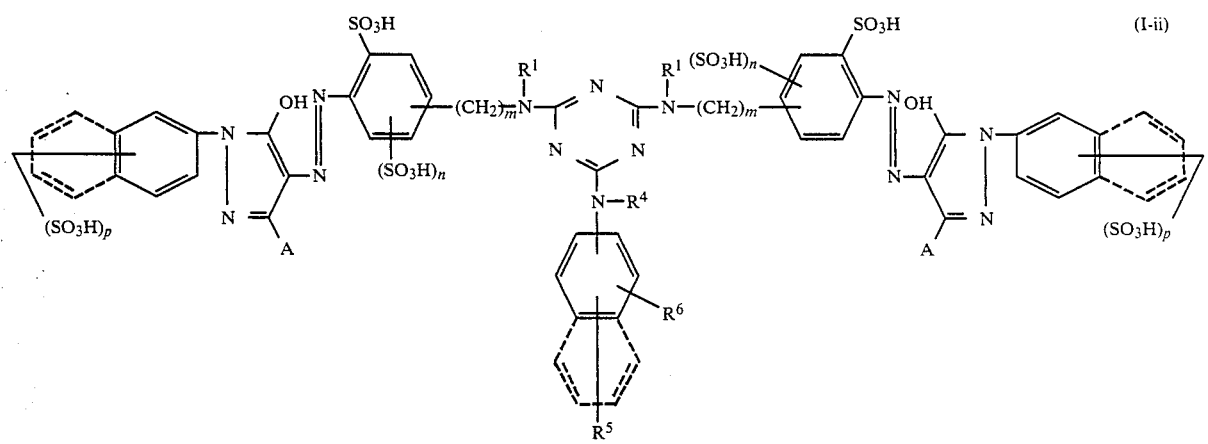

(wherein $R^1$, $R^4$, $R^5$, $R^6$, p, A, m and n have the same meaning as defined in the above-mentioned general formula (I)).

By using a pyridone-containing compound represented by a general formula (V-ii), On the other hand, the colorant of the invention represented by the above-mentioned general formula (I) wherein i is 1, can be prepared by the following process.

2 moles of a compound represented by a general formula (VII),

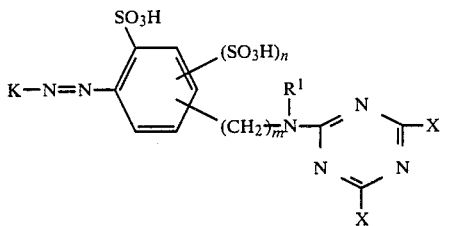

(wherein K, $R^1$, m and n have the same meaning as defined in the above-mentioned general formula (I) and X represents a halogen atom) and 1 mol of a compound represented by a general formula (VIII),

(wherein Q has the same meaning as defined in the abovementioned general formula (I)) are condensed to form a compound represented by the following general formula (IX),

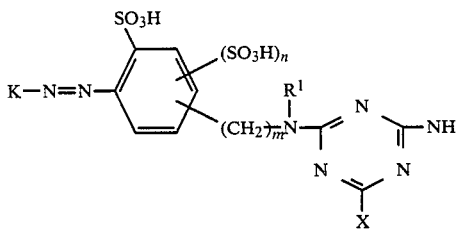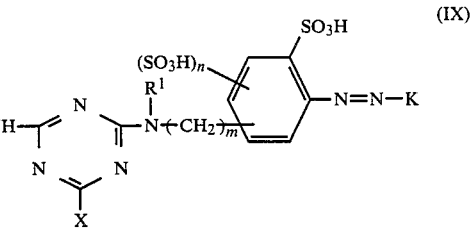

(wherein K, Q, $R^1$, m and n have the same meaning as defined in the above-mentioned general formula (I)).

Next, the compound represented by the general formula (IX) is reacted with a compound represented by the above-mentioned general formula (VI) to obtain the object colorant of the invention represented by the above-mentioned general formula (I) wherein: l is 1. Further, a compound represented by the general formula (IX) wherein X is a fluorine atom, is included in the disazo colorant of the invention.

To obtain the object product from a reaction solution, a salting out process is used usually but a spray drying process can also be applied to a reaction solution without being altered.

The water soluble disazo colorant of the invention can be used widely as a dyestuff to dye fiber and cloth, as a colorant for coloring of paper and synthetic resins and as a colorant for use in inks for printers of ink jet type. Above all, the colorant shows a high reaction ratio for cellulose in a usual dyeing process for cellulose which is conducted at a pH of 7 and over and also does not decompose and shows a high reaction ratio in a dyeing process conducted at a high temperature of 130° C. or higher under a weak acid state having a pH value of from 5 to 6, so that the colorant has such excellent suitability as a reactive dye not seen in the conventional products.

As fiber which can be dyed by using the disazo colorant of the invention as a dyestuff, there may be mentioned cellulose-containing fiber such as cotton, viscose rayon, cuprommonium rayon, hemp, and the like, and nitroge-containing fiber such as polyamides, wool, silk and the like, but cellulose fiber is, in particular, preferred. Further, the above-mentioned fiber may be mixed fiber thereof with polyester, triacetate, polyacrylonitrile, or the like. The preferred mixed fiber is mixed fiber of cellulose with polyester at a mixing ratio of from 5/95 to 95/5.

To dye fiber by use of the disazo colorant of the invention, a dyestuff necessary to dye fiber other than cellulose-containing fiber, for example, a disperse dyestuff or the like mentioned in the Color Index (3rd edition) can be added to a dyeing bath containing the present disazo colorant. As such a disperse dyestuff, there may be mentioned quinophthalone type dyestuff, anthraisothiazole type dyestuff, perinone type dyestuff, pyrazolone type monoazo dyestuff and pyridone type monoazo dyestuff, or the like.

To dye cellulose-containing fiber by use of the disazo colorant of the invention, a dyeing bath is prepared by mixing a disazo colorant represented by the above-mentioned general formula (I), a buffering agent necessary to maintain the pH value of dyeing bath within a rangee of from 5 to 10, preferably from 7 to 9 during the dyeing (which buffering agent is a single compound or a mixture of compounds selected from acids such as carbonic acid, phosphoric acid, acetic acid, citric acid, and the like and sodium or potassium salts of these acids in an amount of usually about 0.5 to 5.0 g/l), with an electrolyte such as sodium chloride or sulfate in an amount of usually about 1 to 150 g/l, preferably 40 to 80 g/l, as required, and then, cellulose-containing fiber is thrown into the dyeing bath and dyed at from 100° to 150° C., preferably from 120° to 140° C. for from 30 to 50 min. Thus, good dyeing for the cellulose-containing fiber can be carried out.

To dye a blended yarn fabric, a combined filament yarn fabric, or the like manufactured by mixing cellulose-containing fiber with other fiber, for example, polyester fiber, a dyeing bath is prepared by further adding a disperse dyestuff mentioned in the above-mentioned Color Index to the above-mentioned dyeing bath, and the cellulose-containing fiber and polyester fiber can be dyed at the same time by a single bath, one-stage method using the newly prepared dyeing bath. In this process, the pH value of dyeing bath is maintained within a range of from 5 to 10, preferably from 7 to 9.

Further, to dye such a blended yarn fabric or a combined filament yarn fabric, as mentioned above, a conventional single-bath two-stage process comprising dyeing one fiber with a dyeing bath and subsequent dyeing the other fiber with the same dyeing bath may be applied and also a two-bath process for combining a dyeing process by using the disazo colorant of the invention with a dyeing process for fiber other than cellulose-containing fiber to dye cellulose-containing fiber and another fiber separately with different dyeing bathes can be adopted.

Further, the disazo colorant of the invention reacts with fiber in a dyeing process because a vinyl sulfone-containing reactive group —$SO_2Ch_2CH_2W$ represented by Y in the formula (I) is converted into —SO₂CH=CH₂ to react with fiber.

The disazo colorant of the invention is a novel compound and is useful as a yellow colorant. In particular, if the compound is used for dyeing of cellulose containing fiber or nitrogen-containing fiber, it provides effects of various good fastness and of excellent dyeing property. Further, the effect can be obtained even under dyeing conditions adopted as the ones for polyester fiber, for example, under a high-temperature dyeing condition at from 120° to 140° C., so that the disazo colorant of the invention is, in particular, suitable as a reactive dyestuff which is used together with a water insoluble disperse dyestuff to dye a mixed fiber of polyester fiber with cellulose-containing fiber or nitrogen-containing fiber at the same time by a single-bath one-stage process.

The invention will be described in more detail referring to examples hereinafter. However, it is not limited to these examples.

EXAMPLE 1

Preparation of colorant

A reaction of 18.8 g of 2,4-diaminobenzene sulfonic acid with 18.5 g of trichlorotriazine was carried out in 600 ml of water at from 0° to 5° C. under condition of pH 5. After that, 18.8 g of 2,4-diaminobenzene sulfonic acid was added to the reaction mixture and a condensation reaction was carried out under a temperature of from 20° to 25° C. and pH of 6. Subsequently, 150 g of sodium chloride was added to the reaction solution to salt out the reaction product, and thus, 34.5 g of diamino compound represented by formula as set forth below was obtained.

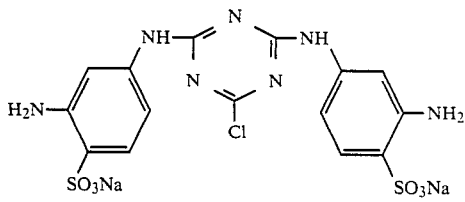

1 mol of the diamino compound was tetrazotized according to a conventional method, subsequently the tetrazotized compound was coupled with 2 mols of pyrazolone compound represented by the following formula,

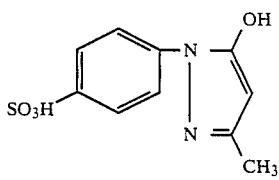

in the form of free acid and, as a result, a disazo compound represented by a formula as set forth below in the form of free acid was formed.

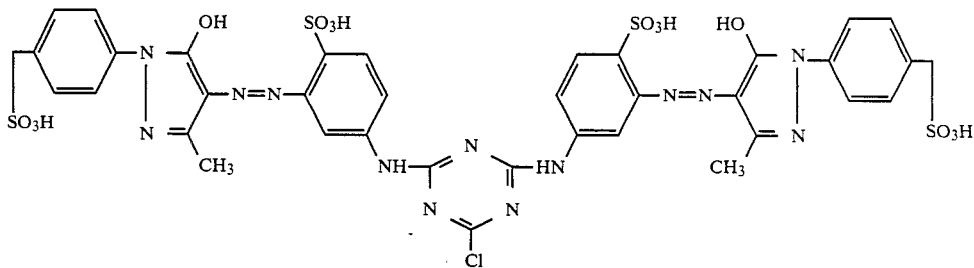

10.8 g of the disazo compound was dissolved in 300 g of water, 3.0 g of 3-(beta-hydroxyethyl)sulfonyl aniline sulfuric ester was added to the solution and the mixture was heated to 90° C. and reacted at that temperature for 12 hours under condition of pH 6. Subsequently, the reaction solution was salted out with potassium chloride and the reaction product was dried. Thus, the disazo colorant of the invention having structure represented by a formula as set forth below in the form of free acid and having λmax of 395 nm (water) of a visible light absorption analysis was obtained.

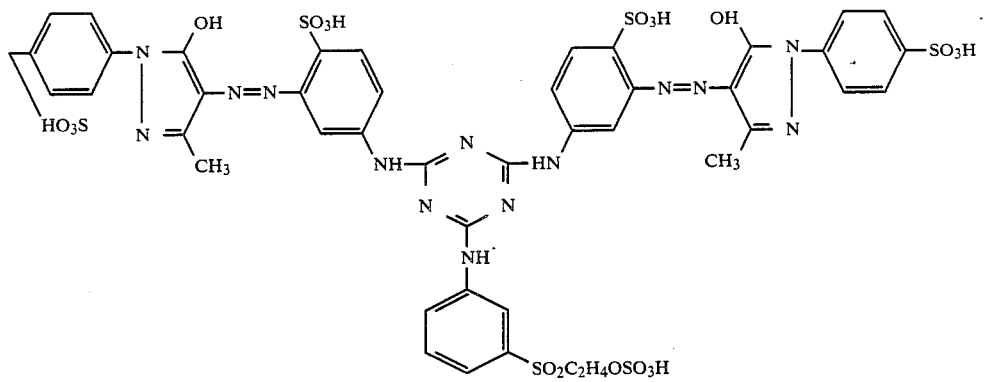

Dyeing of cellulose fiber 0.2 g of the disazo colorant of the invention prepared by the above-mentioned preparation example, 16 g of sodium sulfate and 0.5 g of Na₂HPO₄.12H₂O and 0.02 g of KH₂PO₄ as a buffering agent were added to 200 ml of water to prepare a dyeing bath. 10 g of non-mercerized cotton knit fabric was put into the dyeing bath and subsequently, the dyeing bath was heated to 130° C. taking 30 minutes before the dyeing of the fabric was carried out at that temperature for 30 minutes. Subsequently, washing, soaping, washing, and drying were carried out, and a yellow dyed product was obtained. The pH value of the dyeing bath was maintained at 7.8 throughout the dyeing process.

In the dyeing test, the degree of exhaustion was as good as 78% and the obtained dyed product had a very high color density and a good color fastness to light of 4th to 5th class.

EXAMPLE 2

Dyeing of polyester/cellulose mixed fiber

A mixed dyestuff comprising 0.2 g of the water soluble disazo colorant of the invention obtained in the preparation example in Example 1 and 0.2 g of prior known monoazo disperse dyestuff for polyester represented by the following formula,

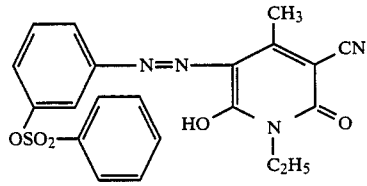

12 g of sodium sulfate, and 0.1 g of Na₂B₄O₇.10H₂O and 0.4 g of KH₂PO₄ as a buffering agent were added to 200 ml of water to prepare a dyeing bath. 10 g of a blended yarn fabric having a mixing ratio of polyester to cotton of 50 to 50 was put into the dyeing bath, which was heated to 130° C. taking 30 minutes before the fabric was dyed at that temperature for 60 minutes. Subsequently, washing, soaping, washing, and drying were carried out successively, and a yellow dyed product having good solid dyeing properties was obtained. The pH value of the dyeing bath was 7.8 through out the dyeing process.

In the dyeing test, each dyestuff had very good dyeing property and the obtained dyed product had a very high color density and a good color fastness to light of 4th to 5th class.

EXAMPLE 3

Various water soluble disazo colorants of the invention shown in Table 1 were synthesized by a method similar to the method of preparation example in Example 1 and the maximum absorption wavelength λmax (nm) (in water) was measured for each of disazo colorants thus obtained. The results were shown in Table 1. Each colorant was used as a dyestuff and a cotton cloth was dyed in the same method as in dyeing example in Example 1. Each of dyed products thus obtained had a color tone as shown in Table 1 and had a good degree of exhaustion of 65% and over and a good color fastness to light of 4th to 5th class.

TABLE 1

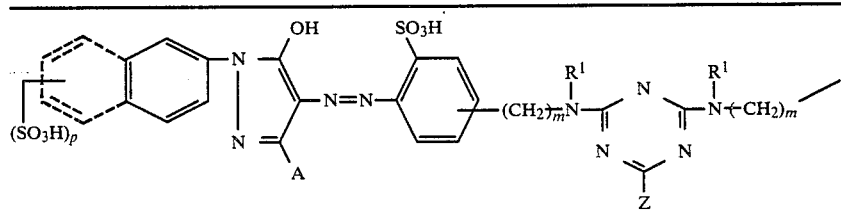

TABLE 1-continued

[Structure at top: benzene ring with SO₃H and CH₃ substituents, connected via N=N to a central unit with OH, A groups, and =N-NH- to a naphthalene ring with (SO₃H)ₚ substituents]

| No. | (naphthalene with (SO₃H)ₚ) | (benzene with SO₃H and -(CH₂)ₘ-N(R¹)-) | -A | -Z | C.T. | λmax (nm) (Water) |
|---|---|---|---|---|---|---|
| 3-1 | naphthalene-1,5-disulfonic acid (2-yl) | 4-SO₃H, 2-CH₃, -NH- | -CH₃ | -NH-C₆H₃(Cl)-SO₂C₂H₄OSO₃H | Yellow | 394 |
| 3-2 | " | " | " | -NH-C₆H₄-SO₂CH=CH₂ | " | " |
| 3-3 | " | " | " | -F | " | " |
| 3-4 | benzene-2-SO₃H | 4-SO₃H, -NH- | " | -N(CH₃)- naphthalene with SO₂C₂H₄OSO₃H and SO₃H | " | 394 |
| 3-5 | naphthalene-1,5-disulfonic acid (2-yl) | SO₃H, CH₃, N(CH₃)- | -CH₃ | -NH- naphthalene with HO₃S and SO₂C₂H₄OSO₃H | Yellow | 395 |
| 3-6 | " | SO₃H, CH₃, -NH- | " | -NH-C₆H₄-SO₂C₂H₄OSO₃H | " | 394 |
| 3-7 | 4-HO₃S-benzene | " | -CH₃ | -N(CH₃)-C₆H₂(OCH₃)(CH₃)-SO₂C₂H₄Cl | " | 391 |

TABLE 1-continued

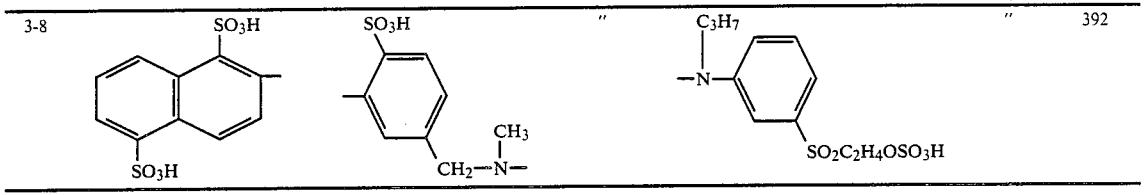

Abbreviation C.T.: Color tone of cotton cloth

COMPARATIVE EXAMPLE 1

A disazo dyestuff mentioned in U.S. Pat. No. 4,453,945 which was represented by formula as set forth below in the form of free acid was used and a dyeing test was carried out in the same method as in a dyeing example for cellulose fiber in Example 1. As a result, the degree of exhaustion was only 42%.

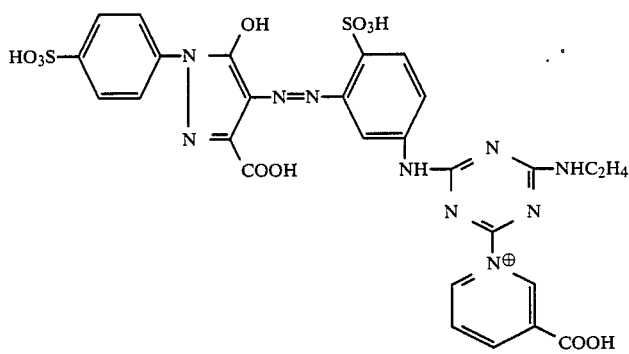

From the result, it is found that such a prior known disazo reactive dyestuff is unsuitable for high-temperature dyeing at 120° C. or higher although it has two reactive groups in the molecule.

EXAMPLE 4

Preparation of colorant

A disazo colorant of the invention represented by formula as set forth below in the form of free acid having λmax of 420 nm (water) of a visible light absorption analysis was prepared by a process similar to the process of preparation example in Example 1.

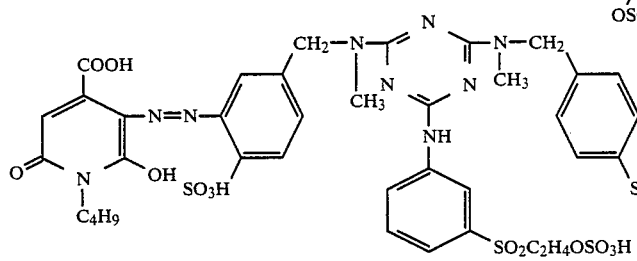

Dyeing of cellulose fiber 0.2 g of the disazo colorant of the invention prepared in the above-mentioned preparation example, 16 g of sodium sulfate, and 0.5 g of Na₂HPO₄.12H₂O and 0.02 g of KH₂PO₄ as a buffering agent were added to 200 ml of water to prepare a dyeing bath. 10 g of non-mercerized cotton knit fabric was put into the dyeing bath, which was heated to 130° C. taking 30 minutes before the cotton knit fabric was dyed at that temperature for 30 minutes. Subsequently, washing, soaping, washing, and drying were carried out successively, and thus a yellow dyed product was obtained. The pH value of the dyeing bath was 7.8 throughout the dyeing process.

In the dyeing test, the dyestuff had a good degree of exhaustion of 71% and the obtained dyed product had a very high color density and also a good color fastness to light of 4th to 5th class.

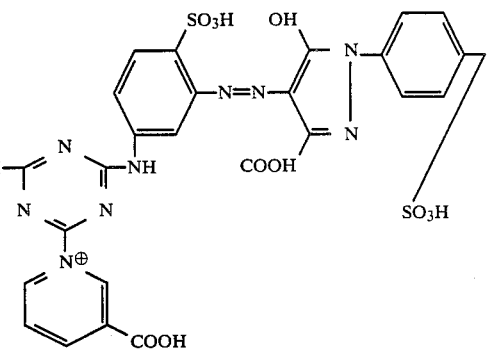

EXAMPLE 5

Dyeing of polyester/cellulose mixed fiber

Mixed dyestuff comprising 0.2 g of water soluble disazo colorant of the invention obtained in the preparation example in Example 4, 0.2 g of prior known monoazo disperse dye for polyester represented by the following formula,

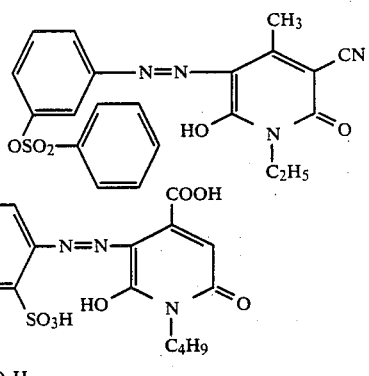

12 g of sodium sulfate, and 0.1 g of Na₂B₄O₇.10H₂O and 0.4 g of KH₂PO₄ as a buffering agent were added to 200 ml of water to prepare a dyeing bath. 10 g of blended yarn fabric having a mixing ratio of polyester to cotton of 50 to 50 was thrown into the dyeing bath, which was heated to 130° C. taking 30 minutes before the fabric was dyed at that temperature for 60 minutes. Subsequently, washing, soaping, washing, and drying were carried out successively, and thus a yellow dyed product having good solid dyeing property was obtained. The pH value of the dyeing bath was 7.8 throughout the dyeing process.

In the dyeing test, each dyestuff had very good dyeing property and the obtained dyed product had a very high color density and also a good color fastness to light of 4th to 5th class.

EXAMPLE 6

Various water soluble disazo colorant of the invention shown in Table 2 in the form of free and acid were synthesized by a method similar to the method of preparation example in Example 4, and the maximum absorption wavelength λmax (nm) (in water) was measured for each of disazo colorant thus obtained. The result was shown in Table 2. Each colorant was used as a dyestuff and a cotton cloth was dyed by the same method as in the dyeing example in Example 4. As a reult, each of dyed product had a color tone as shown in Table 2 and had a good degree of exhaustion of 65% and over and also good color fastness to light of 4th to 5th class.

TABLE 2

[Structure: disazo colorant with pyridone groups, azo linkages, phenyl-SO₃H groups, (CH₂)ₘ-N(R¹) linkers to central triazine ring bearing Z substituent, with R³, R², A, and R¹ substituents]

| No. | −R³ | −R² | −A | (phenyl with (CH₂)ₘ−N(R¹)− and SO₃H) | −Z | C.T. | λmax (nm) (Water) |
|---|---|---|---|---|---|---|---|
| 6-1 | −CH₂SO₃H | −C₂H₅ | −CH₃ | CH₂−N(CH₃)− on tolyl-SO₃H | −N(C₂H₅)−phenyl−SO₂C₂H₄OSO₃H | yellow | 428 |
| 6-2 | −Cl | −C₃H₇ | " | " | −F | " | " |
| 6-3 | −CONH₂ | −C₈H₁₇(iso) | " | NH− on tolyl-SO₃H | " | " | 422 |

| No. | −R³ | −R² | −A | (phenyl with (CH₂)ₘ−N(R¹)− and SO₃H) | −Z | C.T. | λmax (nm) (Water) |
|---|---|---|---|---|---|---|---|
| 6-4 | −CONH₂ | −C₄H₉ | −CH₃ | NH− on tolyl-SO₃H | −N(CH₃)−naphthyl(SO₂C₂H₄OSO₃H)(SO₃H) | yellow | 422 |
| 6-5 | −COOH | −C₈H₁₇ | " | " | −NH−phenyl(Cl)(SO₂C₂H₄OSO₃H) | " | 420 |
| 6-6 | " | −C₃H₆OC₂H₅ | " | " | −N(CH₃)−phenyl(OC₂H₅)(SO₂C₂H₄Cl)(CH₃) | " | 421 |

TABLE 2-continued

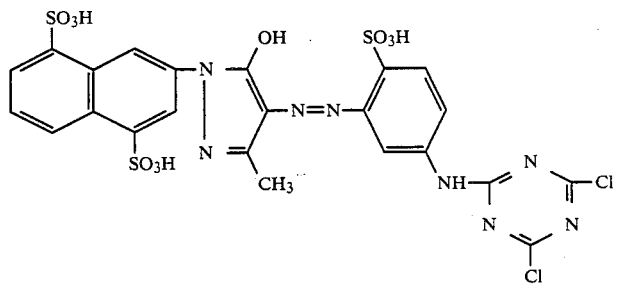

| | | | | | | |
|---|---|---|---|---|---|---|
| 6-7 | —H | —C₂H₅ | —COOH | " | -NH- (naphthalene with HO₃S and SO₂C₂H₄OSO₃H) | " | 420 |
| 6-8 | —Br | " | —CH₃ | " | -N(H)-C₆H₄-SO₂C₂H₄OSO₃H | " | 427 |
| 6-9 | —CH₂SO₃H | " | " | " | —F | " | 421 |

Abbreviation ... C.T.: Color tone of cotton cloth

COMPARATIVE EXAMPLE 2

A disazo dyestuff mentioned in U.S. Pat. No. 4,453,945 which was represented by a formula as set forth below in the form of free acid was used and a dyeing test was carried out in the same method as in dyeing example for cellulose fiber in Example 4. As a ture dyeing at 120° C. or higher although it has two reactive groups in the molecule.

EXAMPLE 7

Preparation of colorant

A condensation reaction of 2 mols of monoazo compound represented by the following formula,

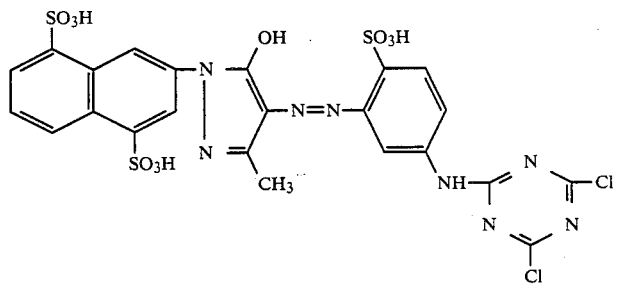

result, the degree of exhaustion was only 52%.

in the form of free acid with 1 mol of ethylenediamine was carried out in an aqueous medium at 30° to 40° C. under condition of pH 7.5. As a result, a disazo compound represented by the following formula in the form of free acid was formed.

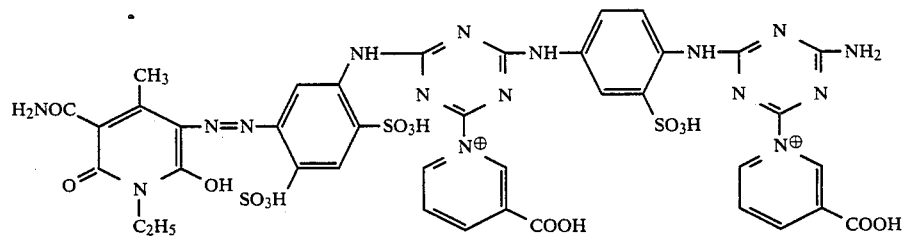

From the result, it is found that such a prior known disazo reactive dyestuff is unsuitable to high-tempera-

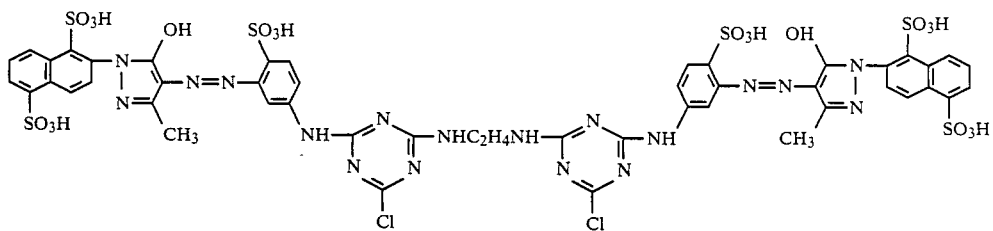

Further, to a reaction mixture containing the disazo compound, 2.8 mols of 3-(beta-hydroxyethyl)sulfonylaniline sulfuric ester were added, and the mixture was reacted for 12 hours under conditions of temperature of 90° C. and of pH 5. After that, the reaction product was salted out with sodium chloride and then dried, and thus, a disazo colorant represented by formula as set forth below in the form of free acid was prepared.

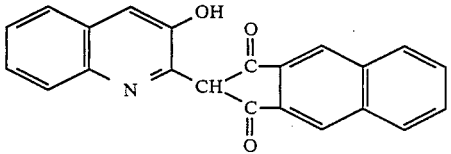

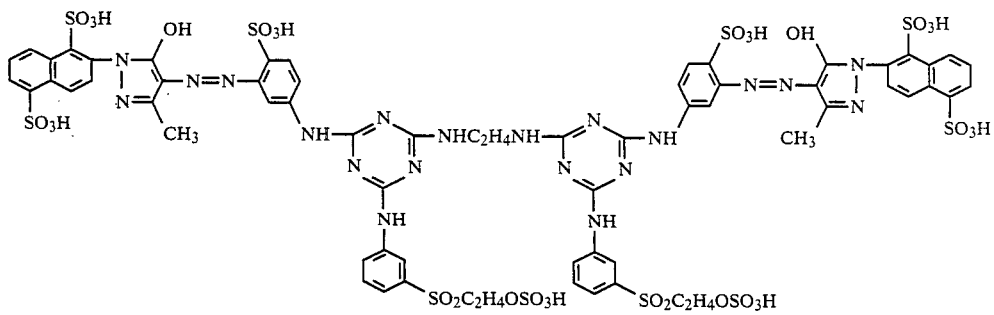

[λmax 395 nm (water)]

Dyeing of cellulose fiber 0.2 g of disazo colorant prepared by the above-mentioned process, 16 g of sodium sulfate, and 0.4 g of sodium hydrogencarbonate as a buffering agent were added to 200 ml of water to prepare a dyeing bath. 10 g of non-mercerized cotton knit fabric was thrown into the dyeing bath, which was heated to 130° C. taking 30 minutes before the cotton knit fabric was dyed at that temperature for 30 minutes. Subsequently, washing, soaping, washing and drying were carried out successively, and thus, a yellow dyed product was obtained. The pH value of the dyeing bath was 8.4 throughout the dyeing process.

In the dyeing test, the dyestuff had a good degree of exhaustion of 79%, and the obtained dyed product had a very high yellow color density and also a good color fastness to light of 4th to 5th class.

EXAMPLE 8

Mixed dyestuff comprising 0.2 g of disazo colorant of the invention prepared in Example 7, 0.2 g of prior known quinophthalone dye for polyester represented by the following formula, 12 g of sodium sulfate and 0.4 g of sodium hydrogencarbonate as a buffering agent were added to 200 ml of water to prepare a dyeing bath. 10 g of a blended yarn fabric having a mixing ratio of polyester to cotton of 50 to 50 was thrown into the dyeing bath, which was heated to 130° C. taking 30 minutes before the fabric was dyed at that temperature for 60 minutes. Subsequently, washing, soaping, washing, and drying were carried out successively, and thus, a yellow dyed product having good solid dyeing property was obtained. The pH value of the dyeing bath was 8.2 throughout the dyeing process.

In the dyeing test, each dyestuff had very good dyeing property and the obtained dyed product had a very high color density and also good color fastness to light of 4th to 5th class.

EXAMPLE 9

Various disazo colorants of the invention shown in Table 3 in the form of free acid were synthesized in a method similar to the method of Example 7 and the maximum absorption wavelength λmax (nm) (in water) was measured for each of disazo colorant thus obtained. The results were shown in Table 3. Each colorant was used as a dyestuff, and a blended yarn fabric having a mixed ratio of polyester to cotton of 50 to 50 was dyed in the same method as in Example 8. Each dyed product thus obtained was a good dyed one and had a color tone as shown in Table 3 and good color fastness to light of 4th to 5th class.

TABLE 3
| No. | | —A— | —Q— | —Z$^1$ | —Z$^2$ | CT Y | λmax (W) (nm) |
|---|---|---|---|---|---|---|---|
| 9-1 | (SO$_3$H structure) | —CH$_3$ | —C$_2$H$_4$OC$_2$H$_4$— | (—NH-phenyl-SO$_2$C$_2$H$_4$OSO$_3$H) | (—NH-phenyl-SO$_2$C$_2$H$_4$OSO$_3$H) | Y | 395 |
| 9-2 | " | " | " | " | " | " | 394 |
| 9-3 | " | " | " | " | " | " | 395 |
| 9-4 | " | " | " | " | " | " | 395 |

TABLE 3-continued

| | | | | | Y |
|---|---|---|---|---|---|
| 9-10 | HO₃S—⟨benzene⟩— | —COOH | —CH(CH₂CH₂)₂CH— (cyclohexane-1,4-diyl) | —NH—⟨benzene⟩—SO₂C₂H₄SSO₃H | —NH—⟨benzene⟩—SO₂C₂H₄SSO₃H | 393 |
| 9-11 | " | " | —C₂H₄— | —NH—⟨naphthalene, SO₃H⟩—SO₂C₂H₄Cl | —NH—⟨naphthalene, SO₃H⟩—SO₂C₂H₄Cl | 393 |
| 9-12 | ⟨naphthalene-1,5-di-SO₃H⟩ | " | —C₃H₆— | (CH₃)(C₃H₇)N—⟨benzene⟩—SO₂C₂H₄OSO₃H | (CH₃)(C₃H₇)N—⟨benzene⟩—SO₂C₂H₄OSO₃H | 395 |
| 9-13 | " | " | ⟨m-phenylene⟩ | (CH₃)₂N—⟨naphthalene⟩—SO₂C₂H₄OSO₃H | (CH₃)₂N—⟨naphthalene⟩—SO₂C₂H₄OSO₃H | 395 |
| 9-14 | " | " | ⟨2,4-dimethylphenylene⟩ | —NH—⟨benzene⟩—SO₂C₂H₄OSO₃H | —NH—⟨benzene⟩—SO₂C₂H₄OSO₃H | 395 |
| 9-15 | ⟨naphthalene, SO₃H, CH₃⟩ (l) (10%) | —COOH | ⟨2,5-dimethyl-SO₃H-phenylene⟩ | —F | —NH—⟨benzene⟩—SO₂C₂H₄OSO₃H | 394 |

TABLE 3-continued
| No. | (structure 1) | (structure 2) | (structure 3) | λ |
|---|---|---|---|---|
| (2) (90%)  |  | " | " | " |
| 9-16 | " | " |  | 393 |
| 9-17 | —CH₃ | " |  | 394 |
(*) No. 9-15 is a mixture of colorant (1) and colorant (2) at a mixing ratio by weight of 10:90.
Abbreviation . . . CT: Color tone of cotton cloth, Y: Yellow, (W): (Water)

EXAMPLE 10

Preparation of colorant

A condensation reaction of 2 mols of monoazo compound represented by the following formula,

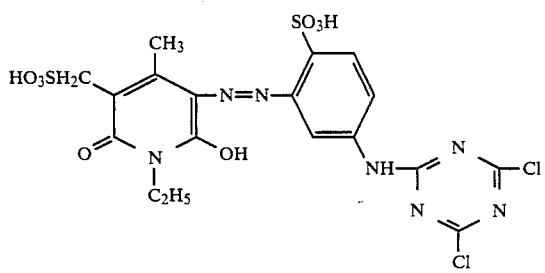

in the form of free acid with 1 mol of p-phenylenediamine was carried out in an aqueous medium under conditions of temperature of from 30° to 40° C. and of pH 7. As a result, a disazo compound represented by the following formula in the form of free acid was formed.

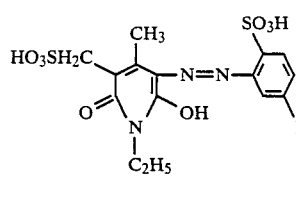

Subsequently, to a reaction mixture containing the disazo compound, 2 mols of 3-(beta-hydroxyethyl)sulfonylaniline sulfuric ester were added and the mixture was reacted at 90° C. for 7 hours under a condition of pH 5. After that, the reaction product was salted out with potassium chloride and dried and thus, a disazo colorant represented by the following formula in the form of free acid was obtained.

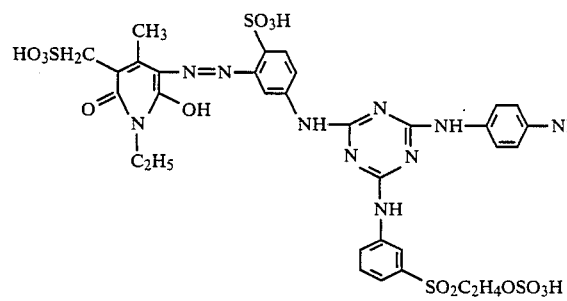

[λmax: 419 nm (water)]

Dyeing of cellulose fiber 0.2 g of disazo colorant prepared by the above-mentioned process, 16 g of sodium sulfate, and 0.5 g of Na$_2$HPO$_4$.12H$_2$O and 0.02 g of KH$_2$PO$_4$ as a buffering agent were added to 200 ml of water to prepare a dyeing bath. 10 g of mercerized cotton knit fabric was thrown into the dyeing bath, which was heated to 120° C. taking 30 minutes before the cotton knit fabric was dyed at that temperature for 60 minutes. Subsequently, washing, soaping, washing and drying were carried out successively and thus, a yellow dyed product was obtained.

The pH value of the dyeing bath was 7 throughout the dyeing process.

In the dyeing test, the dyestuff had a very good degree of exhaustion of 80%, and the obtained dyed product had a very high yellow color density and also good color fastness to light of 4th to 5th class.

EXAMPLE 11

Preparation of colorant

A condensation reaction of 2 mols of monoazo compound represented by the following formula,

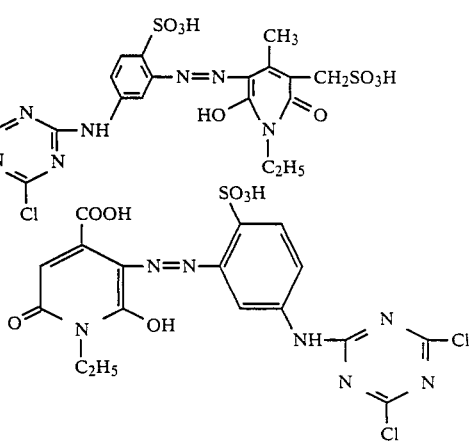

in the form of free acid with 1 mol of ethylenediamine was carried out in a water medium under conditions of temperature of from 30° to 40° C. and pH 7.5. As a result, a disazo compound represented by formula as set forth below in the form of free acid was formed.

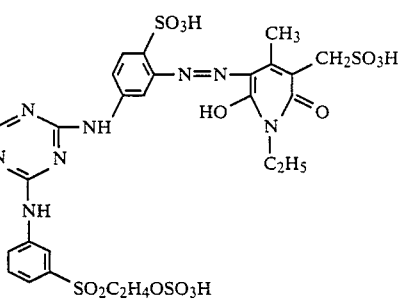

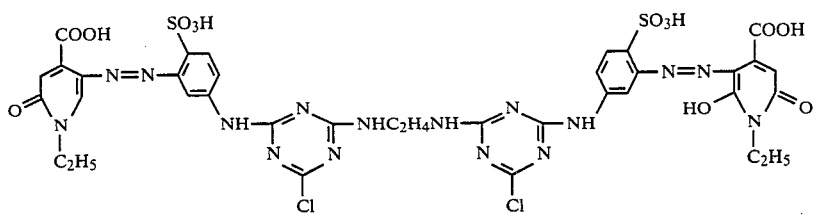

Further, to a reaction mixture containing the disazo compound, 3.0 molS of 3-(beta-hydroxyethyl)sulfonylaniline sulfuric ester were added, and the mixture was reacted for 12 hours under conditions of temperature of 90° C. and of pH 5. After that, the reaction product was salted out with sodium chloride and then dried, and thus, a disazo colorant represented by formula as set forth below in the form of free acid was obtained.

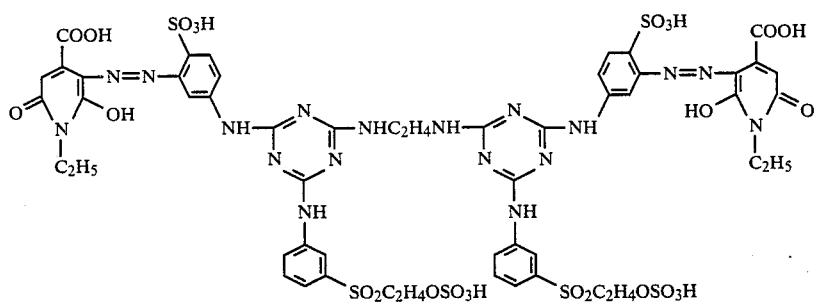

[λmax: 418 nm (water)]

Dyeing of cellulose fiber 0.2 g of the disazo colorant prepared by the above-mentioned process, 16 g of sodium sulfate, and 0.4 g of sodium hydrogencarbonate as a buffering agent were added to 200 ml of water to prepare a dyeing bath. 10 g of non-mercerized cotton knit fabric was thrown into the dyeing bath, which was heated to 130° C. taking 30 minutes before the cotton knit fabric was dyed at that temperature for 30 minutes. Subsequently, washing, soaping, washing and drying were carried out successively and thus, a yellow dyed product was obtained. The pH value of the dyeing bath was 8.4 throughout the dyeing process.

In the dyeing test, the dyestuff had a good degree of exhaustion of 76% and the obtained dyed product had a very high yellow color density and also good color fastness to light of 4th to 5th class.

EXAMPLE 12

Mixed dyestuff comprising 0.2 g of disazo colorant prepared in Example 10 and 0.2 g prior known quinophthalone dyestuff for polyester represented by the following formula,

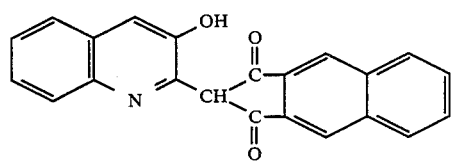

12 g of sodium sulfate, and 0.4 g of sodium hydrogencarbonate as a buffering agent were added to 200 ml of water to prepare a dyeing bath. 10 g of a blended yarn fabric having a mixing ratio of polyester to cotton of 50 to 50 was thrown into the dyeing bath, which was heated to 130° C. taking 30 minutes before the fabric was dyed at that temperature for 60 minutes. Subsequently, washing, soaping, washing and drying were carried out successively and thus, a yellow dyed product having good solid dyeing properies was obtained. The pH value of the dyeing bath was 8.2 throughout the dyeing process.

In the dyeing test, each dyestuff had very good dyeing property and the obtained dyed product had very high color density and also good color fastness to light of 4th to 5th class.

EXAMPLE 13

Various disazo colorants of the invention shown in Table 4 in the form of free acid were synthesized in a method similar to the method of Example 10 and the maximum absorption wavelength λmax (nm) (in water) was measured for each of disazo colorant thus obtained. The results were shown in Table 4. Each colorant was used as a dyestuff and a blended yarn fabric having a mixing ratio of polyester to cotton of 50 to 50 was dyed in the same method as in Example 12. Each dyed product obtained was good dyed one and had good color fastness to light of 4th to 5th class.

TABLE 4

[Structure: Bis-azo dye with two pyridone moieties connected through a triazine bridge]

| No. | $-R^3$ | $-R^2$ | [aniline linker] | $-Q-$ | $-Z^1$ | $-Z^2$ | CT | $\lambda_{max}(W)$ (nm) |
|---|---|---|---|---|---|---|---|---|
| 13-1 | $-CONH_2$ | $-C_3H_7(n)$ | [aniline with $(SO_3H)_n$ and $CH_3$] | [phenylene] | $-NH-C_6H_4-SO_2C_2H_4OSO_3H$ | $-NH-C_6H_4-SO_2C_2H_4OSO_3H$ | Y | 420 |
| 13-2 | " | $-C_4H_9(n)$ | [aniline with $SO_3H$ groups and $CH_3$] | [stilbene-disulfonic acid type, $CH=CH$ with $SO_3H$] | " | " | " | 424 |
| 13-3 | $-H$ | $-C_3H_6SO_3H$ | [aniline with $SO_3H$] | [phenylene with $SO_3H$] | " | " | " | 398 |
| 13-4 | $-COOH$ | $-CH_3$ | [aniline with $SO_3H$ and $CH_3$] | [phenylene with $SO_3H$ and $CH_3$] | " | " | " | 420 |

TABLE 4-continued

| No. | −R³ | −R² | −Z¹ | −Z² | CT | λmax (W) (nm) |
|---|---|---|---|---|---|---|
| 13-5 | −CH₂SO₃H | −C₂H₄OC₄H₉ | 3-(SO₂C₂H₄OSO₃H)-phenyl-NH− | 3-(SO₂C₂H₄OSO₃H)-phenyl-NH− | Y | 419 |
| 13-6 | −Cl | −C₈H₁₇(iso) | 3-(SO₂CH=CH₂)-phenyl-N(C₂H₅)− | 3-(SO₂CH=CH₂)-phenyl-N(C₂H₅)− | " | 428 |
| 13-7 | −SO₃H | −C₂H₄OCH₃ | 4-(SO₂C₂H₄SSO₃H)-phenyl-NH− | 4-(SO₂C₂H₄SSO₃H)-phenyl-NH− | " | 420 |

Q values: 13-5: −C₂H₄OC₂H₄−; 13-6: 3,5-dimethylphenylene (CH₃ substituted); 13-7: −C₂H₄−

TABLE 4-continued

| No. | —R³ | —R² | | —Q— | —Z¹ | —Z² | λmax (W) (nm) CT |
|---|---|---|---|---|---|---|---|
| 13-8 | —CONH₂ | —C₂H₅ | | naphthalene-1,5-disulfonic linker (SO₃H, SO₃H) | —NH—C₆H₄—SO₂C₂H₄OSO₃H (ortho) | —NH—C₆H₄—SO₂C₂H₄OSO₃H (ortho) | 423 |
| 13-9 (1) | —CH₂SO₃H (8%) | —C₂H₅ | | cyclohexane-1,4-diyl (—CH(CH₂CH₂)₂CH—) | F | Y | 421 |
| (2) | —CH₂SO₃H (92%) | " | | " | —NH—C₆H₄—SO₂C₂H₄OSO₃H (meta) | —NH—C₆H₄—SO₂C₂H₄OSO₃H (meta) | " |
| 13-10 | —CH₂SO₃H | —C₂H₅ | | —C₄H₈— | —NH—C₆H₃(CH₃)(OCH₃)—SO₂C₂H₄OSO₃H | —NH—C₆H₃(CH₃)(OCH₃)—SO₂C₂H₄OSO₃H | 421 |

TABLE 4-continued

[Structure: Azo dye with formula containing pyridone rings with R², R³ substituents, CH₃, SO₃H groups, N=N linkages, (SO₃H)ₙ, triazine cores bearing -NH-Q-NH- bridge and -Z¹, -Z² groups]

| No. | -R³ | -R² | -Q- | -Z¹ | -Z² | CT | λmax (W) (nm) |
|---|---|---|---|---|---|---|---|
| 13-11 | " | " | [3,5-disubstituted benzene with -COOH] | [phenyl-NH- with m-SO₂C₂H₄OSO₃H] | [phenyl-NH- with m-SO₂C₂H₄OSO₃H] | " | 420 |
| 13-12 | -CN | -C₂H₄SO₃H | -C₃H₆- | [3-Cl, 5-SO₂C₂H₄OSO₃H phenyl-NH-] | [3-Cl, 5-SO₂C₂H₄OSO₃H phenyl-NH-] | " | 415 |

(*) No. 13-9 is a mixture of colorant (1) and colorant (2) at a mixing ratio by weight of 8:92.
Abbreviation . . . CT: Color tone of cloth, (W): (water), (Y): Yellow

EXAMPLE 14

Dyeing of nitrogen-containing fiber 0.2 g of water soluble disazo colorant of the invention obtained in preparation example in Example 1 was added to 200 ml of water to prepare a dyeing bath. 10 g of 6-nylon taffeta was thrown into the dyeing bath, which was heated to 98° C. taking 60 minutes before the taffeta was dyed at that temperature. Subsequently, washing, soaping, washing and drying were carried out successively, and thus, a yellow dyed product having a high color density was obtained.

While the invention has been described in detail and with reference to specific embodiment thereof, it will be apparent to one skilled in the art that various changes and modifications can be made therein without departing from the spirit and scope thereof.

What is claimed is:

1. A water solule disazo colorant represented by formula (I) in the form of free acid:

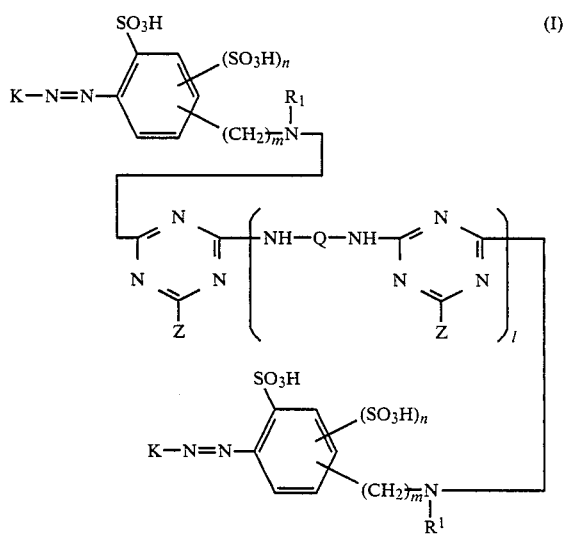

wherein K represents

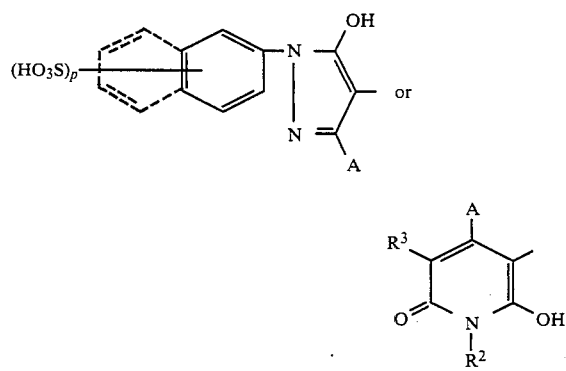

[wherein A represents methyl or carboxyl;
$R^2$ represents hydrogen, allkyl of 1 to 8 carbon, sulfoalkyl of 1 to 4 carbon, or alkyl group of 1 to 4 carbon which is substituted by alkoxy of 1 to 4 carbon;
$R^3$ represents hydrogen, halogen, cyano, —$CONH_2$, carboxyl, sulfonic, or sulfomethyl;

p represents an integer of 1 to 2];
Z represents

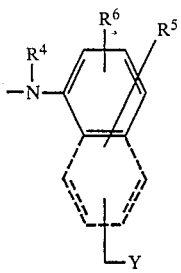

[wherein $R^4$ represents hydrogen or alkyl of 1 to 4 carbon;
$R^5$ and $R^6$ each represents independently hydrogen, alkyl of 1 to 4 carbon, alkoxy of 1 to 4 carbon, sulfonic, or halogen;
Y represents —$SO_2CH=CH_2$ or —$SO_2CH_2CH_2W$ (wherein W represents —$OSO_3H$, —$SSO_3H$, —$OPO_3H_2$, —$OCOCH_3$, or halogen];
$R^1$ represents hydrogen or lower alkyl of 1 to 4 carbon;
Q represents phenylene or naphtylene which may be substituted by alkyl of 1 to 4 carbon, alkoxy of 1 to 4 carbon, halogen, carboxylic, or sulfonic; and
l, m, and n each represents an integer of 0 or 1.

2. A water soluble disazo colorant as in claim 1, wherein K is

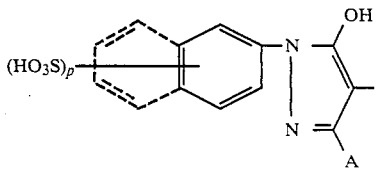

in which A and p are as defined in claim 1.

3. A water solule disazo colorant as in claim 1 wherein l is 0.

4. A water soluble disazo colorant as in claim 1, wherein $R^1$ is a hydrogen atom.

5. A water soluble disazo colorant as in claim 1, wherein m and n each is 0.

6. A water soluble disazo colorant as in claim 1, wherein Z is

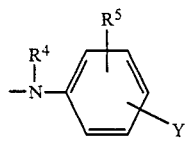

in which $R^4$, $R^5$ and Y are as defined in claim 1.

7. A water soluble disazo colorant as in claim 1, wherein K is

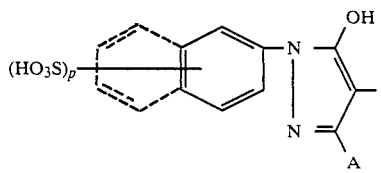

in which A and p are as defined in claim 1 and l is 0.

8. A water soluble disazo colorant as in claim 1, wherein K is

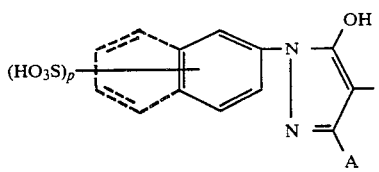

in which A and p are as defined in claim 1 and l is 0, and Z is

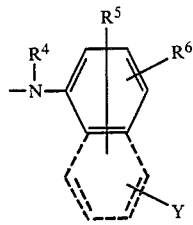

in which $R^4$, $R^5$, $R^6$ and Y are as defined in claim 1.

9. A water soluble disazo colorant as in claim 1, wherein K is

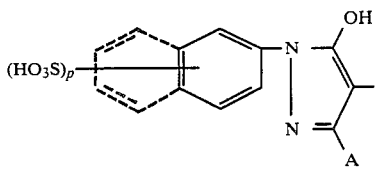

in which A and p are as defined in claim 1, Z is

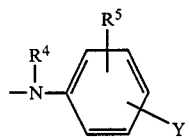

in which $R^4$, $R^5$ and Y are as defined in claim 1, $R^1$ is a hydrogen atom, and l, m, and n each is 0.

10. A water soluble disazo colorant as in claim 1 wherein the colorant is a water soluble reactive dye stuff for dyeing cellulose-containing fiber.

* * * * *